United States Patent
Aoki et al.

(10) Patent No.: US 9,025,422 B2
(45) Date of Patent: May 5, 2015

(54) PLASMON GENERATOR HAVING FLARE SHAPED SECTION

(71) Applicant: TDK Corporation, Tokyo (JP)

(72) Inventors: Susumu Aoki, Tokyo (JP); Kosuke Tanaka, Tokyo (JP); Keita Kawamori, Tokyo (JP); Hiroki Kawato, Tokyo (JP); Takeshi Tsutsumi, Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 13/849,735

(22) Filed: Mar. 25, 2013

(65) Prior Publication Data

US 2014/0286147 A1 Sep. 25, 2014

(51) Int. Cl.
| | |
|---|---|
| G11B 13/04 | (2006.01) |
| G11B 7/1387 | (2012.01) |
| G21K 1/00 | (2006.01) |
| G11B 5/31 | (2006.01) |
| G11B 5/60 | (2006.01) |
| G11B 5/00 | (2006.01) |

(52) U.S. Cl.
CPC ....... *G21K 1/00* (2013.01); *G11B 5/314* (2013.01); *G11B 5/6088* (2013.01); *G11B 2005/0021* (2013.01)

(58) Field of Classification Search
CPC ............ G11B 2005/0021; G11B 5/3116; G11B 5/314; G11B 5/3163; G11B 5/6088; G11B 7/124; G11B 7/1206; G11B 7/1387; G11B 7/24059; G11B 7/24065; G11B 5/4866

USPC ........... 369/13.33, 13.02, 13.32, 112.09, 369/112.14, 112.21, 13.24, 112.27; 385/4–9, 31, 32, 50, 88–94, 129, 385/43–48, 124–128, 130–132; 360/59

See application file for complete search history.

(56) References Cited

U.S. PATENT DOCUMENTS

| | | | | |
|---|---|---|---|---|
| 8,619,517 | B1 * | 12/2013 | Sasaki et al. | 369/13.33 |
| 2003/0066944 | A1 | 4/2003 | Matsumoto et al. | |
| 2010/0103553 | A1 | 4/2010 | Shimazawa et al. | |
| 2010/0328807 | A1 * | 12/2010 | Snyder et al. | 360/59 |
| 2011/0058272 | A1 | 3/2011 | Miyauchi et al. | |
| 2012/0230170 | A1 * | 9/2012 | Hirata et al. | 369/13.33 |
| 2012/0294567 | A1 * | 11/2012 | Osawa | 385/39 |

* cited by examiner

*Primary Examiner* — Wayne Young
*Assistant Examiner* — Dionne Pendleton
(74) *Attorney, Agent, or Firm* — Posz Law Group, PLC

(57) ABSTRACT

The present invention relates to a plasmon generator, in which a surface plasmon is excited by application of light. The plasmon generator extends along one direction. The plasmon generator includes a first end surface that is positioned on one end in the one direction and at which near-field light is generated along with the excitation of the plasmon; and a second cross section that is substantially parallel to the first end surface and is away from the first end surface. The first end surface has a polygonal shape that does not have a substantially acute inner angle. The second cross section has an upper part that has a shape substantially the same as or similar to that of the first end surface and a flare shaped lower part that is connected to the upper part and has a width that increases as it is far from the upper part.

19 Claims, 12 Drawing Sheets

PLASMON GENERATOR HAVING FLARE SHAPED SECTION

BACKGROUND OF THE INVENTION

1. Field of the Invention

The present invention relates to a plasmon generator that couples with light, evanescent light in particular, in a surface plasmon mode and generates near-field light, and a thermally-assisted magnetic head that is provided with the plasmon generator.

2. Description of the Related Art

Currently, along with the advancement of high recording density of a magnetic recording medium (hard disk), further improvement is demanded in the performance of a thin film magnetic head.

A composite type thin film magnetic head that contains a reproducing head having a magnetoresistive effect element (MR element) for reading and a recording head having an inductive transducer for writing is widely used as a thin film magnetic head.

Along with further improvement in the recording density, a new technology is proposed in which a magnetic field for writing is applied to a specified bit of a hard disk to perform magnetic recording while heat is applied to the hard disk to lower a coercive force of the specified bit. Such a technology is referred to as thermally-assisted magnetic recording. Further, a magnetic head for performing the thermally-assisted magnetic recording is referred to as a thermally-assisted magnetic recording head.

In the thermally-assisted magnetic recording, it is preferable that heat is locally applied to a specified recording bit of a hard disk. Therefore, it is conceivable to use near-field light to achieve localized heating.

US 2003/0066944 A1 discloses a near-field light probe (plasmon antenna) that locally generates strong near-field light. The near-field light probe is formed from a metallic scatterer having a shape that is tapered in one direction. The metallic scatterer is directly irradiated with light. The light plasmon-resonates with the metallic scatterer. Thereby, a plasmon is excited in the metallic scatterer.

Due to this localized plasmon, near-field light localized at a front end of the metallic scatterer is generated.

When a front end part of the metallic scatterer is brought close to a recording medium, strong near-field light can be locally applied to a specified bit of the recording medium. This allows a localized region of the recording medium to be efficiently heated.

When the above-described near-field light probe is used, it is known that conversion efficiency for converting the incident light to the near-field light is about 10 to 20%. The remaining 80 to 90% of the light is reflected at a surface of the metallic scatterer or is converted to thermal energy by being absorbed by the metallic scatterer. Usually, the metallic scatterer has a very small volume and may be configured to have a dimension even less than the wavelength of the light. Therefore, due to absorption of energy of the incident light, temperature of the metallic scatterer rises very high. Due to the temperature rising, the metallic scatterer itself may melt.

US 2010/0103553 A1 discloses a plasmon antenna having a configuration different from the above-described plasmon antenna. This plasmon antenna is incorporated into a thin film magnetic recording head. The plasmon antenna has an edge part that couples with light (evanescent light) penetrating from a waveguide in a surface plasmon mode and a front end part that generates near-field light. Specifically, the plasmon antenna is not directly irradiated with light propagating through the waveguide; instead, the evanescent light couples with the edge part in the surface plasmon mode via a buffer layer. A waveguide-type surface plasmon excited by the evanescent light is guided through the plasmon antenna along the edge part. The waveguide-type surface plasmon reaches the front end part of the plasmon antenna and causes near-field light to be generated at the front end part. Due to the near-field light, a specified region (bit) of a hard disk is locally heated.

In the plasmon antenna described in US 2010/0103553 A1, the plasmon antenna is not directly irradiated with an electromagnetic wave; instead, the evanescent light penetrating from the waveguide is used. Therefore, heat generation in the plasmon antenna can be suppressed.

US 2011/058272 A1 also discloses a thermally-assisted magnetic recording head provided with a near-field light generator (plasmon antenna or plasmon generator) that couples with evanescent light in a plasmon mode. In the plasmon antennas described in US 2010/0103553 A1 and US 2011/058272 A1, the waveguide-type surface plasmon is excited.

The plasmon generator described in US 2011/058272 A1 extends long in a direction that intersects with a surface opposing a recording medium, that is, an air bearing surface, and has a substantially V-shape at the air bearing surface. Near-field light is generated at a front end surface of the plasmon generator. However, the near-field light has a spread around not only the V-shaped edge part but also periphery of the edge part. As a result, a recording medium to which the near-field light is applied has a broad heat distribution corresponding to the spread of the near-field light. Due to the broad heat distribution, a bit adjacent to a bit that is originally to be heated may be unintentionally heated so that magnetic information written to the adjacent bit may be unstable. As a result, performance of the magnetic recording may be deteriorated.

Further, in the plasmon antenna that utilizes the waveguide-type surface plasmon, temperature rise during operation is relatively small. However, the small front end part of the plasmon antenna may agglomerate due to heat generation. In particular, when the plasmon antenna is formed of gold (Au), a small portion in a vicinity of a recording-medium-opposing surface (air bearing surface) of the plasmon antenna is likely to agglomerate due to heat. Due to the agglomeration, a shape of the front end part of the plasmon antenna changes and the front end part may be away from the recording medium. As a result, the performance of the magnetic recording may be deteriorated and lifetime of the magnetic head may be reduced.

In order to perform highly reliable magnetic recording, a plasmon antenna (plasmon generator) in which heat generation at a front end part is suppressed and near-field light is locally generated at the front end part is desired.

SUMMARY OF THE INVENTION

The present invention relates to a plasmon generator, in which a surface plasmon is excited by application of light. The plasmon generator extends along one direction. The plasmon generator includes a first end surface that is positioned on one end in the one direction and at which near-field light is generated along with the excitation of the plasmon; and a second cross section that is substantially parallel to the first end surface and is away from the first end surface. The first end surface has a polygonal shape that does not have a substantially acute inner angle. The second cross section has an upper part that has a shape substantially the same as or similar to that of the first end surface and a flare shaped lower part that is connected to the upper part and has a width that increases as it is far from the upper part.

The present invention also relates to a thermally-assisted magnetic recording head, slider, wafer, head gimbal assembly and hard disk drive.

In the above-described plasmon generator, the first end surface at which the near-field light is generated has a polygonal shape that does not have an acute inner angle, and thus is less likely to deform due to heat generation. Further, the flare shaped lower part has a width that increases as it gets far from the upper part. Due to the flare shaped lower part, the volume of the plasmon generator is increased. As a result, heat dissipation performance of the plasmon generator is improved, and thus agglomeration (deformation) of the plasmon generator due to heat can be prevented. As a result of these, the lifetime of the plasmon generator can be improved and highly reliable magnetic recording can be realized.

The above-described and other purpose, features and advantages of the present invention will be clear from the following explanation with reference to the accompanying drawings that illustrate embodiments of the present invention.

BRIEF DESCRIPTION OF THE DRAWINGS

FIG. 17A to FIG. 23A are cross-sectional views of a deposited film during manufacturing a plasmon generator, taken at a cross section that will become an air bearing surface.

FIG. 17B to FIG. 23B are cross-sectional views of the deposited film during the manufacturing the plasmon generator, taken in a plane orthogonal to the air bearing surface.

DETAILED DESCRIPTION OF THE INVENTION

Figure 1:
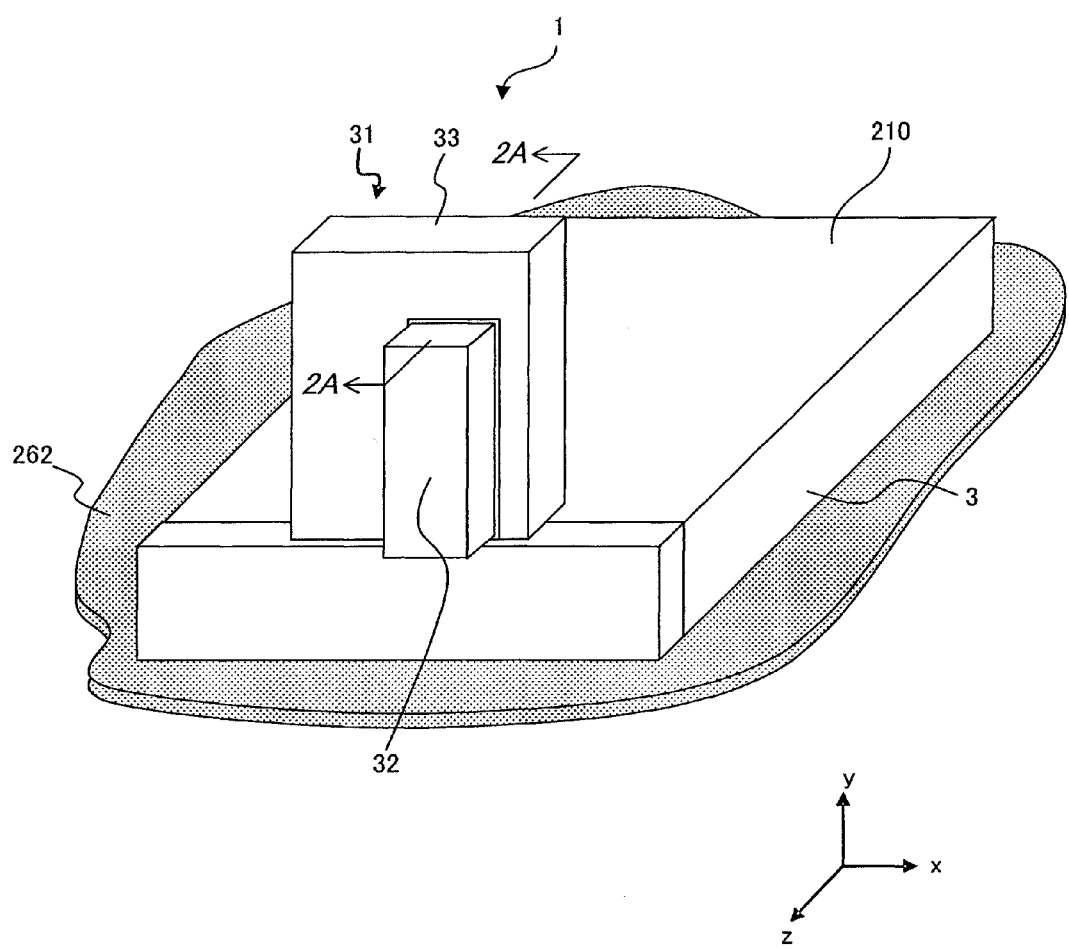
FIG. 1 is a schematic perspective view of a thermally-assisted magnetic head.
Figure 2:
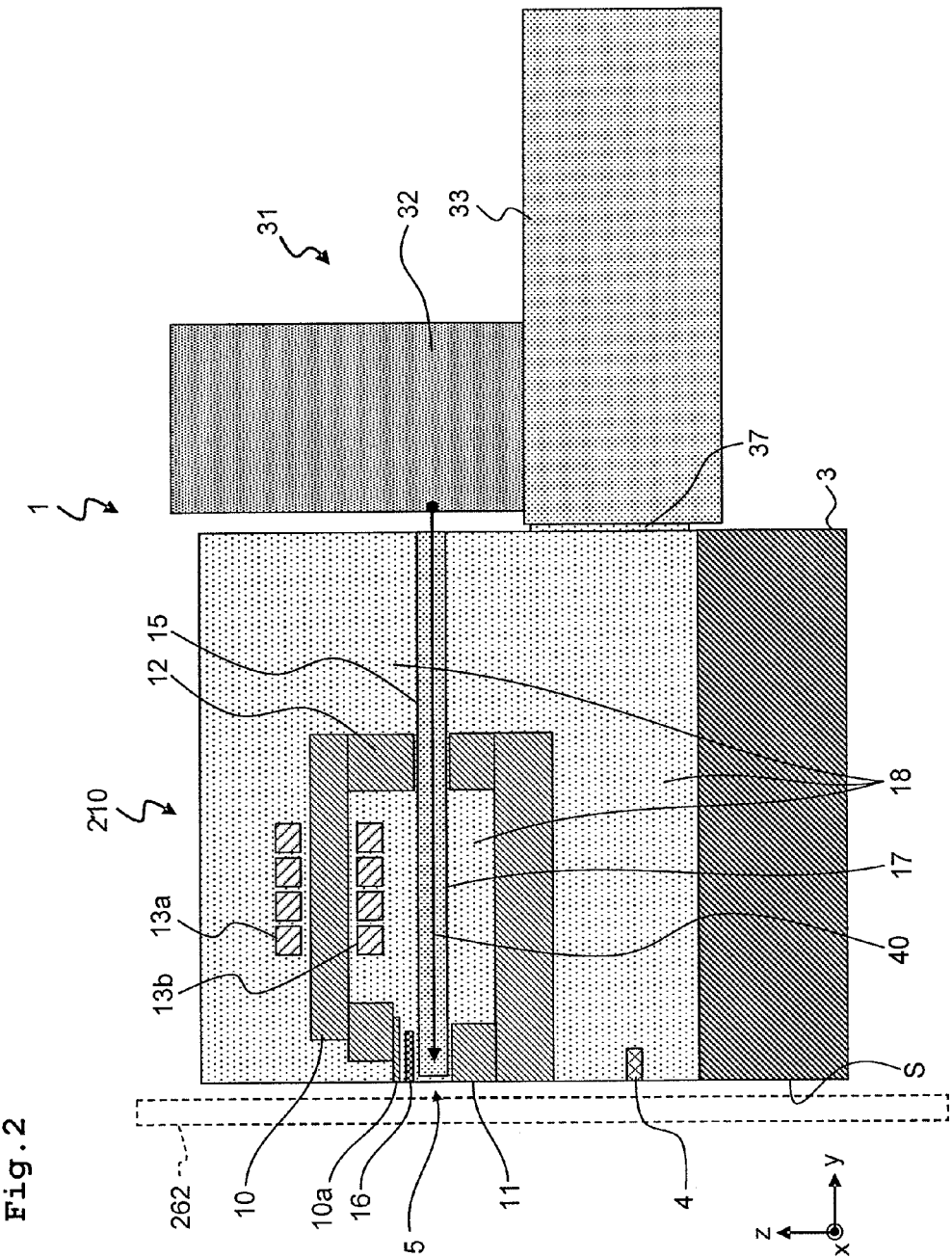
FIG. 2 is a schematic cross-sectional view along a 2A-2A line in FIG. 1.

In the following, with reference to the drawings, a thermally-assisted magnetic head according to an embodiment of the present invention is explained. FIG. 1 is a schematic perspective view of the thermally-assisted magnetic head according to the embodiment. FIG. 2 is a schematic cross-sectional view along a 2A-2A line in FIG. 1.

A thermally-assisted magnetic head 1 includes a slider 210, and a light source 31 that is fixed on the slider 210 and emits laser light. As the light source unit 31, a laser diode unit 31 can be used.

Figure 3:
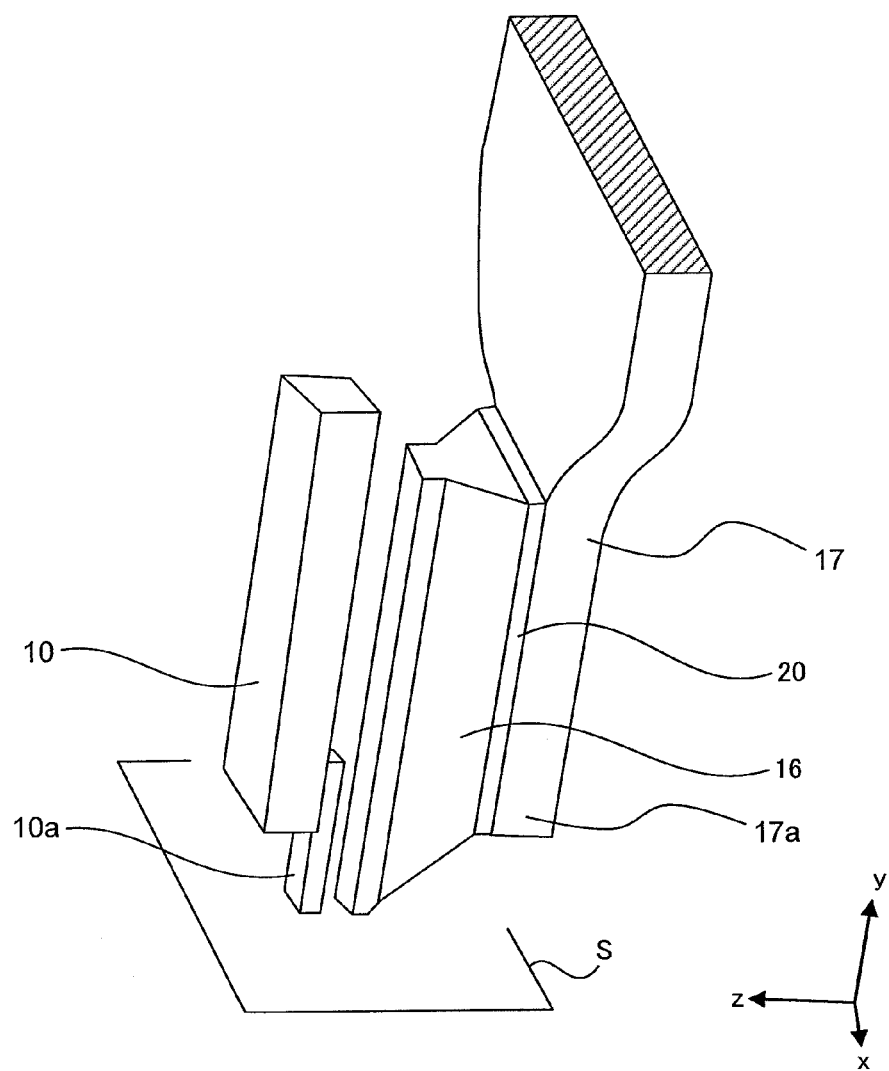
FIG. 3 is a schematic perspective view illustrating a configuration in a vicinity of a magnetic pole, a waveguide and a plasmon generator in a magnetic head.

The slider 210 has a nearly hexahedral shape. One surface of the hexahedron forms a recording medium opposing surface (air bearing surface) S that opposes a magnetic recording medium 262. The slider 210 includes an MR element 4 that configures a reproducing head part, a recording element 5 that configures a recording head part, a waveguide 17, and a plasmon generator 16. FIG. 3 is a schematic perspective view illustrating a configuration in a vicinity of a magnetic pole 10, the waveguide 17 and the plasmon generator 16.

By using a property that electrical resistance changes in response to an external magnetic field, the MR element 4 can detect the external magnetic field, that is, magnetic information recorded in the magnetic recording medium 262. The MR element 4, the magnetic recording element 5, the plasmon generator 16, the waveguide 17 and the like are formed on a substrate 3.

The magnetic recording element 5 may have the magnetic pole 10 for perpendicular magnetic recording. The magnetic pole 10 may be formed from, for example, FeCo. The magnetic pole 10 is adjacent to the plasmon generator 16. A front end part 10a of the magnetic pole 10 is positioned on the air bearing surface S, and generates a magnetic field for recording at the air bearing surface S.

In the vicinity of the magnetic pole 10, a return shield layer 11 is provided. The return shield layer 11 may be formed from a metal. Around the magnetic pole 10, coils 13a, 13b are wound around a contact part 12. Due to a current flowing through the coils 13a, 13b, magnetic flux is induced in the magnetic pole 10. The magnetic flux generated in the magnetic pole 10 is emitted from the front end part 10a of the magnetic pole toward the magnetic recording medium 262.

The magnetic flux emitted from the front end part 10a of the magnetic pole enters the magnetic recording medium 262 and magnetizes each bit of the recording medium 262 in a perpendicular direction (y direction in the drawing). By controlling orientations of the magnetic flux emitted from the magnetic pole 10, any magnetic information can be written to each bit of the recording medium 262. The magnetic flux emitted from the magnetic pole 10 passes through the magnetic recording medium 262 and is absorbed by the return shield layer 11 of the magnetic head 1.

The laser diode unit 31 is positioned on a side opposite to the air bearing surface S of the slider 210. The laser diode unit 31 is provided with a laser diode 32 and a submount 33 mounting the laser diode 32. The submount 33 may be formed from a silicon substrate. The submount 33 may be soldered to the slider 210 by a bonding layer 37.

The laser light emitted from the laser diode unit 31 propagates through the waveguide 17. The waveguide 17 includes a core part 15 that propagates the laser light generated by the laser diode unit 31 as propagation light 40, and a cladding part 18 that covers the core part 15. The refractive index of the cladding part 18 is smaller than the refractive index of the core part 15. The core part 15 can be formed from, for example, silicon dioxide ($SiO_2$) or alumina ($Al_2O_3$). The cladding part 18 can be formed from, for example, tantalum oxide, titanium oxide, or the like.

The laser diode 32 emits laser light toward the core part 15 of the waveguide 17 of the slider 210 in a direction perpendicular to the air bearing surface S. The laser light propagates through the waveguide 17 toward a front end part (a portion close to the air bearing surface S) of the waveguide 17.

The plasmon generator 16 is adjacent to the waveguide 17 in a vicinity of the air bearing surface S (see FIGS. 2 and 3). The plasmon generator 16 is provided between the magnetic pole 10 and the waveguide 17 and is close to the front end part 10a of the magnetic pole 10.

In the example illustrated in FIG. 3, the plasmon generator 16 opposes the front end part 17a of the waveguide at a predetermined spacing. Between the plasmon generator 16 and the waveguide 17, a buffer part 20 having a refractive index lower than the refractive index of the waveguide 17 may be provided. The buffer part 20 functions to cause the laser light propagating though the waveguide 35 to couple with the plasmon generator 16 in a surface plasmon mode. The buffer part 20 may be an insulating layer formed with $SiO_2$ or the like.

The plasmon generator 16 is coupled with the propagation light 40 that propagates through the core part 15 in the surface plasmon mode and generates a surface plasmon. Specifically, based on an optical interface condition of the core part 15 and the buffer part 20, evanescent light is excited in the buffer part 20. The evanescent light excites a surface plasmon (in the present example, a surface plasmon polariton) on a metallic surface of the plasmon generator 16. This conduction-type surface plasmon propagates toward a front end part 160 of the plasmon generator 16 and generates near-field light at the front end part 160 (air bearing surface S) of the plasmon generator 16. The plasmon generator 16 can be formed with any materials, typically metals, in which a surface plasmon is excited due to application of light, evanescent light in particular.

The near-field light generated at the front end of the plasmon generator 16 reaches a surface of the magnetic recording medium 262 and heats a specified bit of the magnetic recording medium 262. An anisotropy field (coercive force) of the heated bit is reduced, so the orientation of the magnetization of this bit can be easily changed. Therefore, while locally heating a region where magnetic recording is performed, that is, a specified bit, by applying a writing magnetic field radiated from the magnetic pole 10 to the bit, magnetic information can be easily recorded. The near-field light has an advantage that allows a local region, in particular, a region smaller than the wavelength of the light, to be selectively heated. Further, without directly irradiating the plasmon generator 16 with an electromagnetic wave propagating through the waveguide 17, by using the evanescent light that penetrates from the waveguide 17, excessive heat generation in the plasmon generator 16 can be suppressed.

Figure 4:
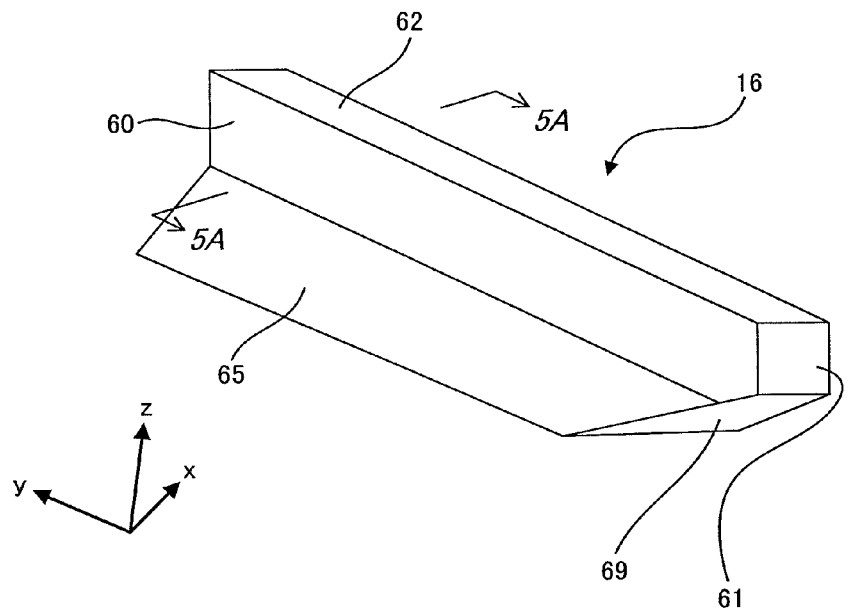
FIG. 4 is a perspective view illustrating a shape of a plasmon generator according to an embodiment of the present invention.
Figure 5:
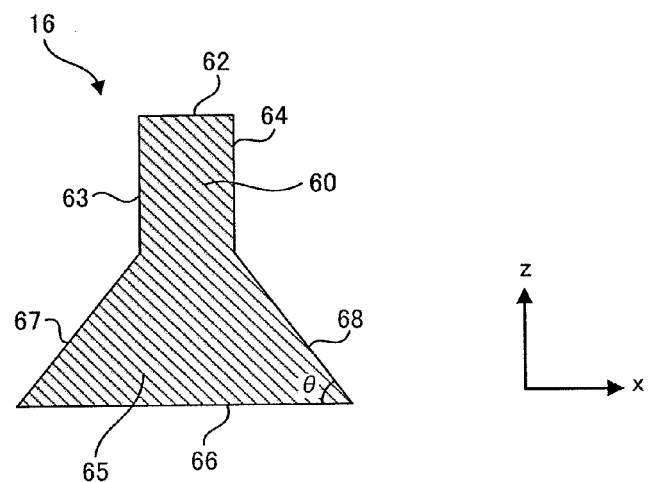
FIG. 5 is a cross-sectional view along a 5A-5A line in FIG. 4.

FIG. 4 is a perspective view illustrating a shape of the plasmon generator of the present invention. FIG. 5 is a cross-sectional view along a 5A-5A line in FIG. 4. The plasmon generator 16 extends long in one direction, that is, the y-direction in the drawing.

The plasmon generator 16 has a first end surface 61 positioned at one end in the y-direction and a second cross section (plane illustrated in FIG. 5) that is substantially parallel to the first end surface 61 and is away from the first end surface 61.

It is preferable that the first end surface 61 of the plasmon generator 16 is square or rectangular. Alternatively, the first end surface 61 may have a polygonal shape that does not have any substantially acute inner angles. The first end surface 61 forms the air bearing surface S. Along with excitation of a surface plasmon, near-field light is generated at the first end surface 61.

A front end part of the plasmon generator 16 tapers toward the first end surface 61. That is, the plasmon generator 16 has an inclined surface 69 for reducing the thickness of a lower part 65 toward the first end surface 61. Due to the inclined surface 69, at the first end surface 61, the flare shaped lower part 65 does not exist, and thus the end surface 61 having a small area is realized. As a result, very strong near-field light is locally generated at the first end surface 61.

A shape having an acute inner angle is vulnerable to heat and easily agglomerates and deforms due to heat. If the plasmon generator has an acute inner angle, due to heat generation, the acute angle portion may agglomerate so that the plasmon generator may deform. In the plasmon generator 16 of the present invention, the first end surface 61 that is likely to generate heat has a polygonal shape that does not have any acute inner angles. Therefore, the plasmon generator 16 is unlikely to deform. As a result, there is an advantage that the lifetime of the plasmon generator 16 is improved.

Further, when the first end surface 61 of the plasmon generator 16 is square or rectangular, as compared to a plasmon generator having a V-shaped end surface, there is an advantage that a spot of the near-field light can be more narrowed down.

As illustrated in FIG. 5, the second cross section of the plasmon generator 16 includes an upper part 60 and a flare shaped lower part 65 that is connected to the upper part 60 and has a width that increases as it gets far from the upper part 60. From a manufacturing point of view, the upper part 60 usually has substantially the same or similar shape as that of the first end surface 61. At the second cross section, the width in the x-direction of the lower part 65 of the plasmon generator 16 increases gradually toward a bottom side 66. Further, at the second cross section, it is preferable that the upper part 60 is substantially rectangular or square.

More specifically, as illustrated in FIG. 5, a contour of the upper part 60 at the second cross section may include a linear top side 62 and a pair of first lateral sides 63, 64 that are connected to end points of the top side 62 and are substantially orthogonal to the top side 62. A contour of the lower part 65 at the second cross section may include a bottom side 66 that is substantially parallel to the linear top side 62 and a pair of second lateral sides 67, 68 that are inclined at acute angles with respect to the bottom side 66 and are connected to end points of the bottom side 66. The pair of the first lateral sides 63, 64 are respectively connected to the pair of the second lateral sides 67, 68. That is, the lateral side 63 is connected to the lateral side 67, and the lateral side 64 is connected to the lateral side 68. As illustrated in FIG. 5, the lateral sides 63, 64 may be respectively connected to the lateral sides 67, 68 at predetermined angles. Alternatively, the lateral sides 63, 64 may be respectively continuously connected to the lateral sides 67, 68 by a smooth curve (see also FIGS. 8B and 9B).

The angle between the bottom side 66 and the lateral side 67 and the angle θ between the bottom side 66 and the lateral side 68 are preferably within a range of 10 to 90 degrees or are more preferably about 70 degrees.

The flare shaped lower part 65 faces the waveguide 17 and is a portion to which the light for exciting the surface plasmon is applied. The lower part 65 of the plasmon generator couples with the evanescent light penetrating from the waveguide 17 in the plasmon mode. The upper part 60 of the plasmon generator 17 faces the magnetic pole 10.

As described above, the flare shaped lower part 65 has a width that increases as it gets far from the upper part 60. Due to the flare shaped lower part 65, the volume of the plasmon generator 16 is increased. As a result, the heat dissipation performance of the plasmon generator 16 is improved, and the agglomeration (deformation) of the plasmon generator 16 due to heat can be prevented. As a result, the lifetime of the plasmon generator 16 or the thermally-assisted magnetic recording head 1 can be improved.

Figure 6:
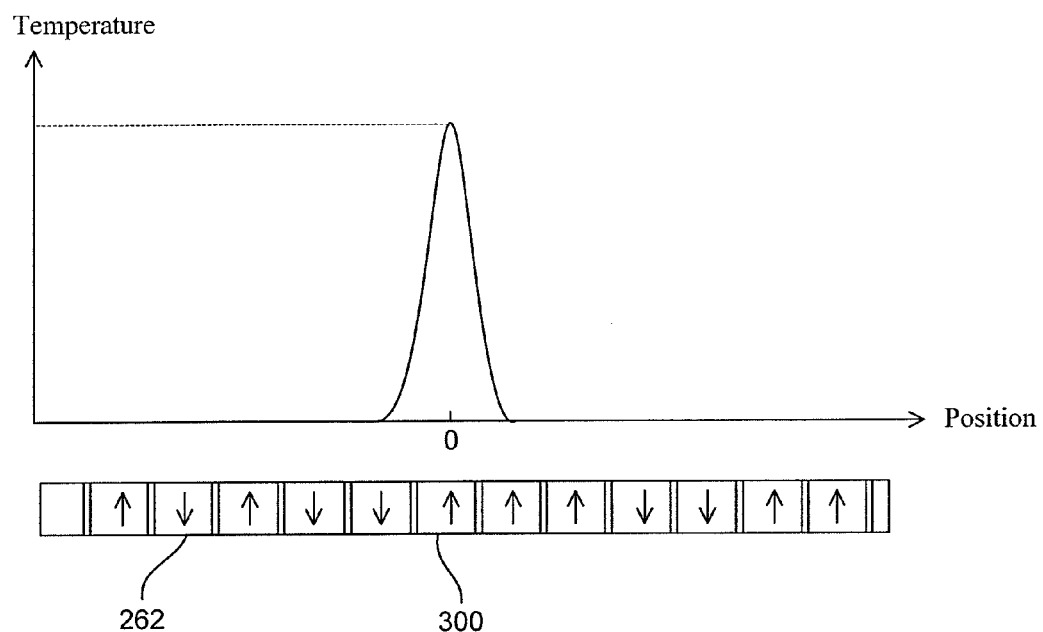
FIG. 6 illustrates a heat distribution of a recording medium when near-field light generated from a plasmon generator is applied to a specified bit of a magnetic recording medium.
Figure 7:
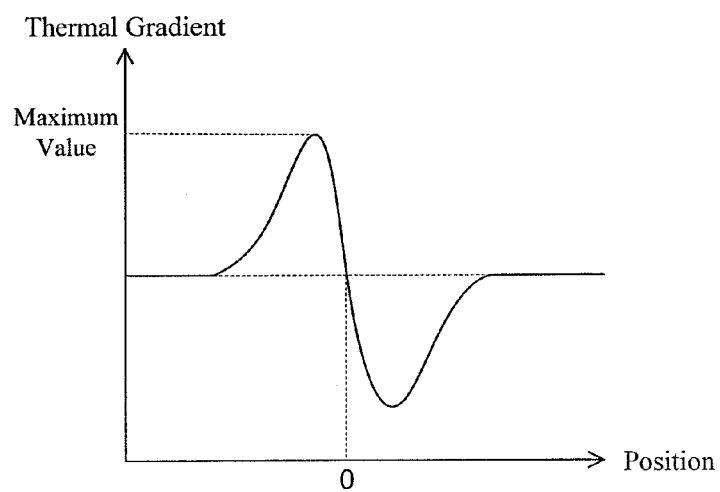
FIG. 7 illustrates derivative of the heat distribution illustrated in FIG. 6.

FIG. 6 illustrates an example of the heat distribution of the recording medium 262 when the near-field light generated from the plasmon generator 16 is applied to a specified bit 300 of the magnetic recording medium 262. FIG. 7 illustrates the derivative, that is, the temperature gradient, of the heat distribution illustrated in FIG. 6. In the graphs of FIGS. 6 and 7, the horizontal axis represents the position on the recording medium. In these graphs, the origin "0" of the horizontal axis indicates the position of the bit 300 to which the near-field light is applied.

As illustrated in the graphs, the near-field light emitted from the plasmon generator 16 locally heats the specified bit 300 of the recording medium 262. Due to the heat, the anisotropy field of the specified bit 300 is reduced and the magnetization of the bit becomes unstable. In this state, by applying a writing magnetic field generated from the magnetic pole 16 to the bit 300, the magnetization of the specified bit 300 can be easily reversed.

Here, when the spread of the heat distribution on the recording medium 262 is large, bits adjacent to the specified bit 300 are also heated, and the magnetizations of the adjacent bits also become unstable. As a result, the magnetic information of the adjacent bits may be lost. Therefore, it is desirable that the heat distribution due to the near-field light of the plasmon generator be as sharp as possible. In other words, as illustrated in the graph of FIG. 7, it is desirable that the maximum value of the temperature gradient be as large as possible.

In the following, a relation between the temperature gradient of the heat distribution and the shape of the plasmon generator 16, when the near-field light generated by the plasmon generator 16 is used to locally heat the magnetic recording medium, is explained.

Figure 8A:
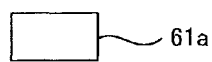
FIG. 8A is a plan view illustrating a first end surface that forms an air bearing surface of a plasmon generator in a first example.
Figure 8B:
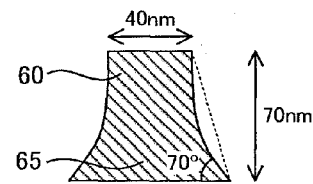
FIG. 8B is a cross-sectional view illustrating a second cross section of the plasmon generator in the first example, the second cross section being parallel to the air bearing surface and being at a position away from the air bearing surface.
Figure 9A:
FIG. 9A is a plan view illustrating a first end surface that forms an air bearing surface of a plasmon generator in a second example.
Figure 9B:
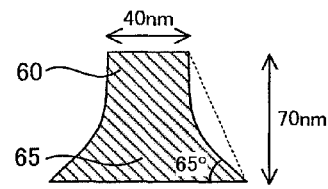
FIG. 9B is a cross-sectional view illustrating a second cross section of the plasmon generator in the second example, the second cross section being parallel to the air bearing surface and being at a position away from the air bearing surface.
Figure 10A:
FIG. 10A is a plan view illustrating a first end surface that forms an air bearing surface of a plasmon generator in a third example.
Figure 10B:
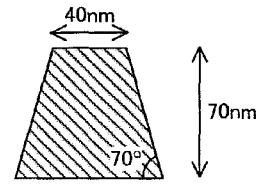
FIG. 10B is a cross-sectional view illustrating a second cross section of the plasmon generator in the third example, the second cross section being parallel to the air bearing surface and being at a position away from the air bearing surface.
Figure 11A:
FIG. 11A is a plan view illustrating a first end surface that forms an air bearing surface of a plasmon generator in a fourth example.
Figure 11B:
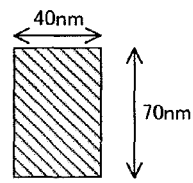
FIG. 11B is a cross-sectional view illustrating a second cross section of the plasmon generator in the fourth example, the second cross section being parallel to the air bearing surface and being at a position away from the air bearing surface.
Figure 12A:
FIG. 12A is a plan view illustrating a first end surface that forms an air bearing surface of a plasmon generator in a fifth example.
Figure 12B:
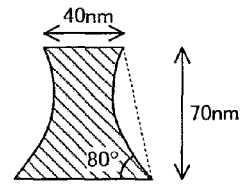
FIG. 12B is a cross-sectional view illustrating a second cross section of the plasmon generator in the fifth example, the second cross section being parallel to the air bearing surface and being at a position away from the air bearing surface.

First, various shapes of the plasmon generator 16 are explained using FIGS. 8A to 12A and FIGS. 8B to 12B. FIGS. 8A and 8B respectively illustrate a first end surface and a second cross section of a plasmon generator according to a first example. FIGS. 9A and 9B respectively illustrate a first end surface and a second cross section of a plasmon generator according to a second example. FIGS. 10A and 10B respectively illustrate a first end surface and a second cross section of a plasmon generator according to a third example. FIGS. 11A and 11B respectively illustrate a first end surface and a second cross section of a plasmon generator according to a fourth example. FIGS. 12A and 12B respectively illustrate a first end surface and a second cross section of a plasmon generator according to a fifth example. Here, the first end surface is a plane that forms the air bearing surface of the plasmon generator 16 and is a plane that corresponds to the portion of the reference numeral 61 in FIG. 4. The second cross section is a cross section that is substantially parallel to the first end surface and is away from the first end surface and is a plane that corresponds to a cross section along a 5A-5A line illustrated in FIG. 4. In the first to fifth examples, the plasmon generator extends along one direction and has a shape that tapers toward the air bearing surface.

In the first and second examples, the first end surfaces 61a, 61b of the plasmon generators are rectangular (see FIGS. 8A and 9A). On the other hand, the second cross sections of the plasmon generators have shapes that include a rectangular upper part and a flare shaped lower part (see FIGS. 8B and 9B).

In the third example, the first end surface 61c of the plasmon generator has a trapezoidal shape (see FIG. 10A). On the other hand, the second cross section of the plasmon generator also has a trapezoidal shape (see FIG. 10B).

In the fourth example, the first end surface 61d of the plasmon generator is rectangular (see FIG. 11A). On the other hand, the second cross section of the plasmon generator is also rectangular (see FIG. 11B).

In the fifth example, the first end surface 61e of the plasmon generator has an inverted flare shape (see FIG. 12A). The first end surface 61e has a shape that has acute inner angles. On the other hand, the second cross section of the plasmon generator has a shape that has a constricted middle portion (see FIG. 12B).

Figure 13:
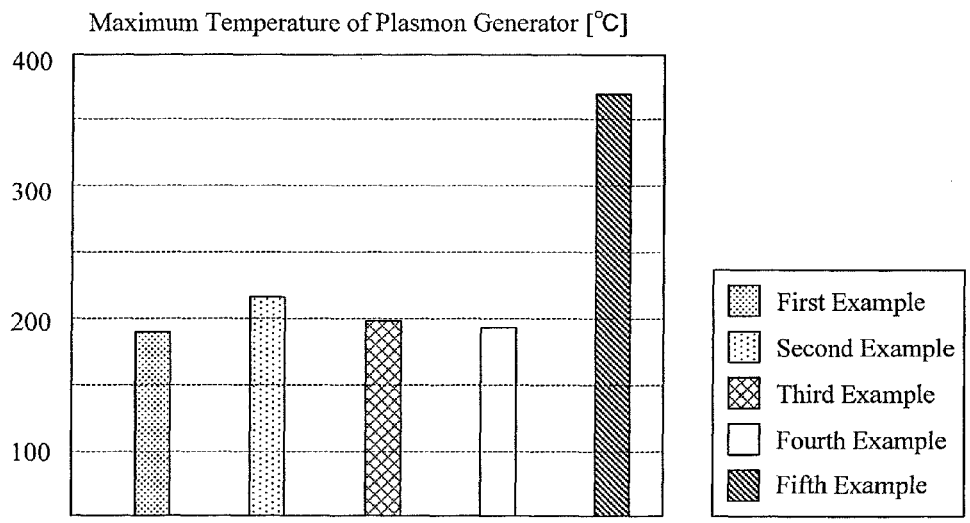
FIG. 13 is a graph illustrating maximum temperatures of the plasmon generators in the above first to fifth examples when thermally-assisted magnetic recording heads containing the plasmon generators are used to locally heat a magnetic recording medium.

FIG. 13 illustrates maximum temperatures of the plasmon generators in the above first to fifth examples when thermally-assisted magnetic recording heads containing the plasmon generators are used to locally heat a magnetic recording medium.

After experiments, the maximum temperatures of the plasmon generators of the first to fourth examples are about 200 Celsius degrees. However, the maximum temperature of the plasmon generator of the fifth example is higher than 350 Celsius degrees. From a point of view of preventing the metal that forms the plasmon generator from melting or agglomerating (deforming), it is preferable that the maximum temperature of the plasmon generator is low. Therefore, the shapes of the plasmon generators of the first to fourth examples are more preferable than the shape of the plasmon generator of the fifth example.

When the plasmon generator having the flare shaped cross section (first example) and the plasmon generator having the rectangular cross section (fourth example) are compared, the maximum temperatures of the plasmon generators are about the same. However, in the plasmon generator of the first example, due to the flare shaped lower part, the heat dissipation performance is improved and thus the lifetime is improved. Actually, the lifetime of the plasmon generator of the first example is about three times longer than the lifetime of the plasmon generator of the fourth example.

Figure 14:
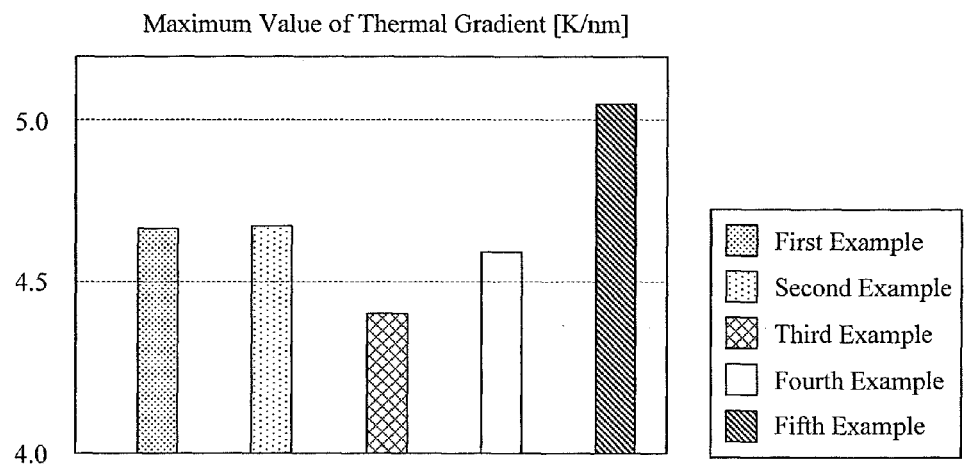
FIG. 14 is a graph illustrating maximum values of thermal gradients of a magnetic recording medium when thermally-assisted magnetic recording heads containing the plasmon generators in the above first to fifth examples are used to locally heat the magnetic recording medium.

FIG. 14 illustrates maximum values of thermal gradients of a magnetic recording medium when thermally-assisted magnetic recording heads containing the plasmon generators of the above first to fifth examples are used to locally heat the magnetic recording medium. As described above, it is preferable that the maximum value of the thermal gradient is large.

As illustrated in FIG. 14, the maximum value of the temperature gradient of the plasmon generator of the fourth example is larger than the maximum value of the temperature gradient of the plasmon generator of the third example. Further, the maximum value of the temperature gradient of the plasmon generator of the first or second example is larger than the maximum value of the temperature gradient of the plasmon generator of the fourth example. Therefore, when both the maximum temperatures illustrated in FIG. 13 and the maximum values of the temperature gradients illustrated in FIG. 14 are considered, the shape of the plasmon generator of the first or second example (see FIGS. 8A, 8B, 9A and 9B) is more preferable.

Figure 15:
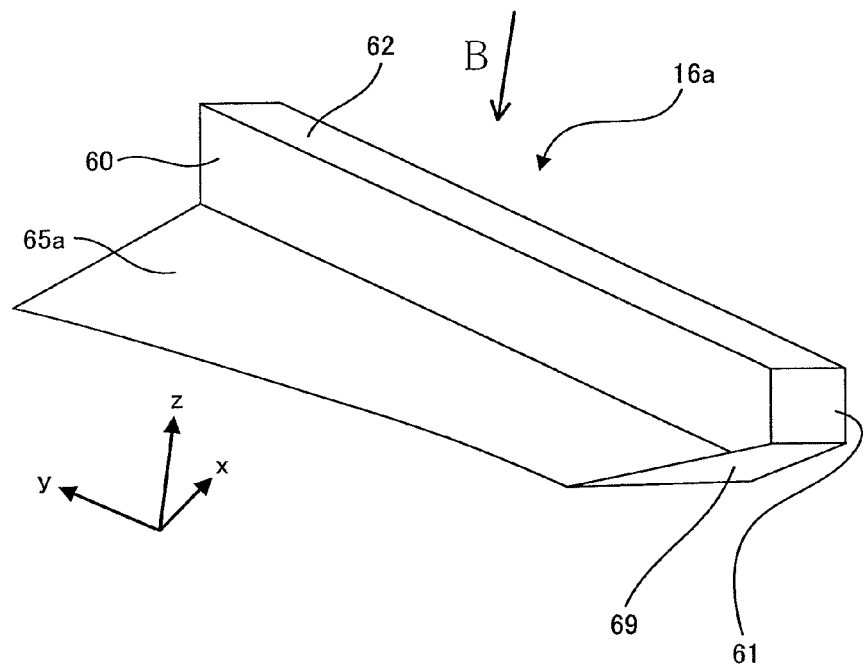
FIG. 15 is a perspective view illustrating a shape of a plasmon generator according to a modified embodiment of the present invention.
Figure 16:
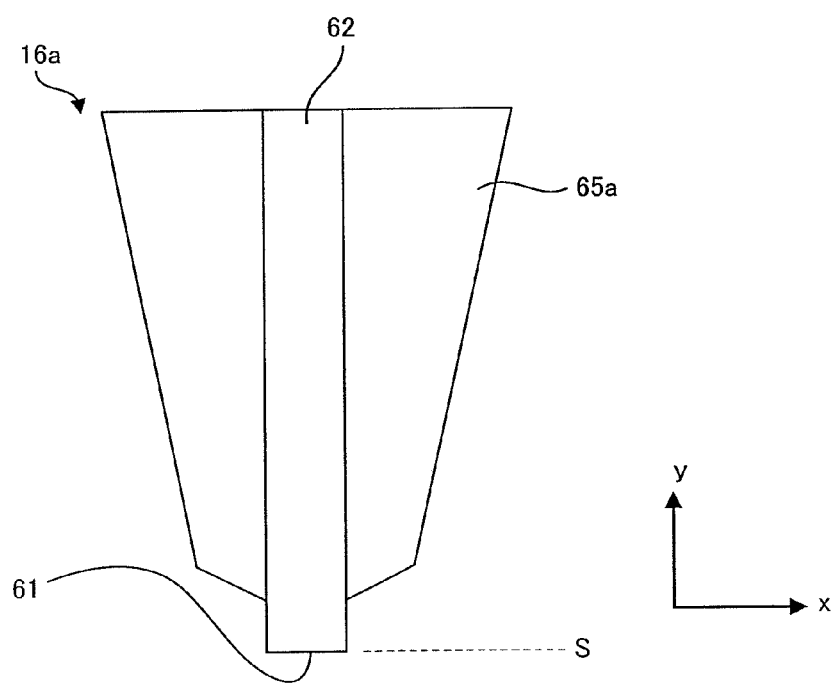
FIG. 16 is a plan view of the plasmon generator viewed from a direction of an arrow B in FIG. 15.

FIG. 15 is a perspective view illustrating a shape of a plasmon generator according to a modified embodiment of the present invention. FIG. 16 is a plan view of the plasmon generator viewed from a direction of an arrow B in FIG. 15. A plasmon generator 16a of the modified embodiment has a rectangular first end surface 61 that forms an air bearing surface S and a second cross section that includes a rectangular upper part 60 and a flare shaped lower part 65a. A shape of the second cross section is the same as the shape illustrated in FIG. 5.

Referring to FIG. 16, a width of the lower part 65a of the plasmon generator 16a, that is, a width in the x-direction in the drawing, increases with distance from the first end surface 61. In this way, the width of the lower part 65a of the plasmon generator 16a increases along both the z-direction and the y-direction. As a result, dimensions of the plasmon generator 16a increase with distance from the air bearing surface S, that is, a portion where near-field light is generated. As a result, it is possible to further improve the heat dissipation performance of the plasmon generator 16a while limiting the region where the near-field light is generated.

The plasmon generators 16, 16a may be formed from an alloy such as AuCu or AuCo. Although AuCu or AuCo has a lower surface plasmon propagation efficiency than Au, there is an advantage that AuCu or AuCo has a higher degree of hardness than Au. Therefore, in a plasmon generator formed from AuCu or AuCo, an effect of preventing agglomeration due to heat is particularly high.

Further, it is preferable that the plasmon generators 16, 16a of the present invention are formed from substantially Au. In the plasmon generators 16, 16a formed from gold, there is an advantage that the propagation efficiency of the surface plasmon is relatively high and the energy loss is low. In the plasmon generators 16, 16a of the present invention, due to the shapes of the plasmon generators 16, 16a, the agglomeration of gold due to heat is suppressed. Therefore, by using gold, a plasmon generator having a relatively high surface plasmon propagation efficiency while preventing a negative effect due to the agglomeration of gold can be provided.

The recording element 5 containing a plasmon generator and the MR element 4 configuring a reproducing head part are formed on the substrate 3 by using thin film forming methods such as sputtering, a CVD method and a plating method and surface processing methods such as etching and polishing. Next, referring to FIGS. 17A to 23A and FIGS. 17B to 23B, a manufacturing method of the plasmon generator 16 having the shape illustrated in FIG. 4 is explained. FIGS. 17A to 23A illustrate a deposited film at a cross section that will become the air bearing surface S. FIGS. 17B to 23B illustrate the deposited film at a cross section orthogonal to the air bearing surface S. In FIGS. 17A to 23A and FIGS. 17B to 23B, each film is sequentially deposited from bottom to top.

Figure 17A:
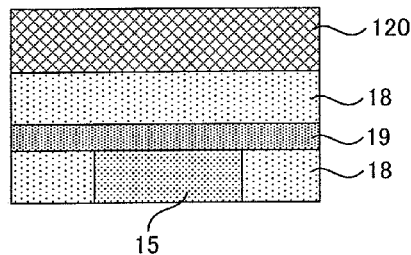
Figure 17B:
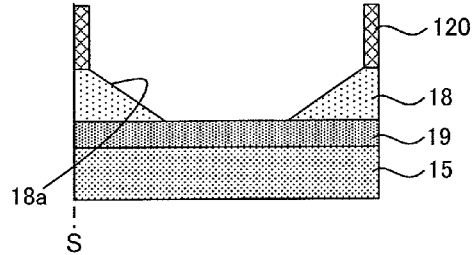

FIGS. 17A and 17B illustrate a portion of the recording element 5 that includes the core part 15 of the waveguide and cladding parts 18, 19 that are insulating layers. The core part 15 may be formed from TaOx. The insulating layer 19 may be formed from alumina. The insulating layer 19 may be formed from $SiO_2$.

First, on top of the insulating layer 18, a photoresist 120 of a predetermined shape is formed. This photoresist is used as a mask, and a portion of the insulating layer 18 is scraped off by milling to form a recess. In this case, the milling is performed in such a manner that an inclined surface 18a is formed on a portion of the insulating layer 18. The inclined surface 18a lowers downward with distance from the air bearing surface S.

Figure 18A:
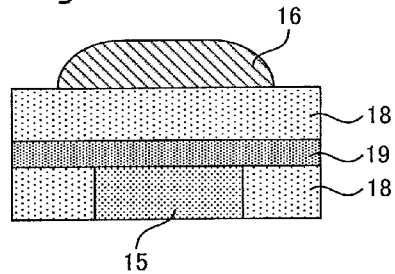
Figure 18B:
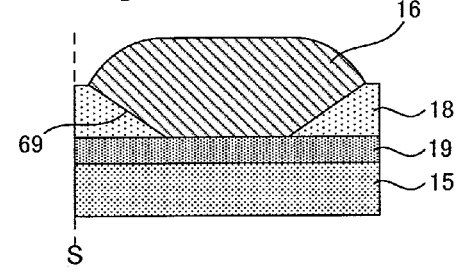

Next, as illustrated in FIGS. 18A and 18B, the recess formed in the insulating layer 18 is filled with a metal layer 16 that will become the plasmon generator. The metal layer 16 can be formed from Au, AuCu, AuCo and the like. An inclined surface of the metal layer 16 corresponding to the inclined surface 18a of the insulating layer 18 configures the inclined surface 61 illustrated in FIG. 4.

Figure 19A:
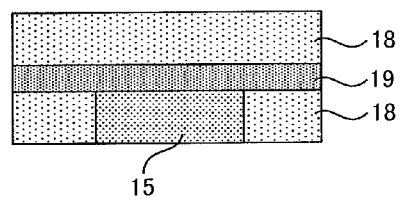
Figure 19B:
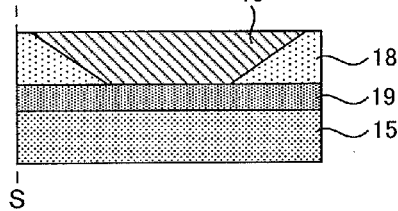
Figure 20A:
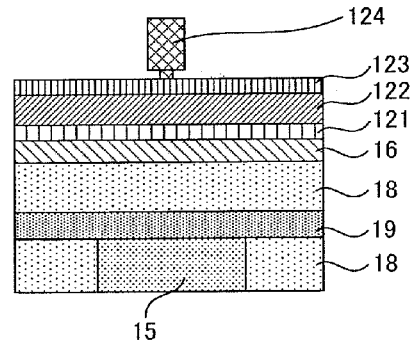
Figure 20B:
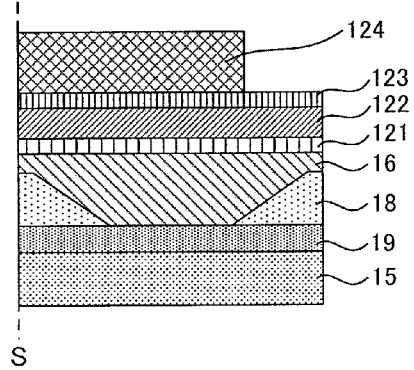

Next, as illustrated in FIGS. 19A and 19B, an upper surface of the metal layer 16 is planarized by, for example, chemical mechanical polishing (CMP). Next, as illustrated in FIGS. 20A and 20B, the metal layer 16 is further deposited. On top of the metal layer 16, an etching stopper layer 121, an etching hard mask layer 122 and an etching mask layer 123 are sequentially deposited by using a sputtering method. Next, on top of the etching mask layer 123, a photoresist 124 of a predetermined shape is formed. The etching stopper layer 121 can be formed from, for example, NiFe. The etching hard mask layer 122 can be formed from, for example, Ta. The etching mask layer 123 can be formed from, for example, NiFe.

Figure 21A:
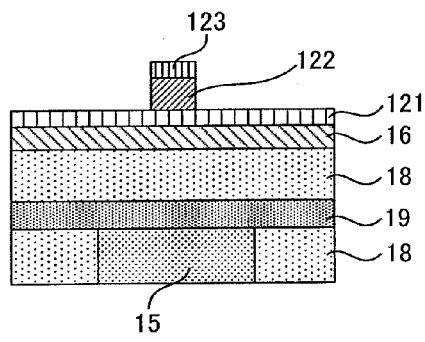
Figure 21B:
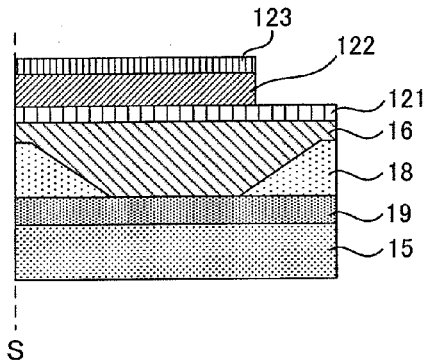

Next, as illustrated in FIGS. 21A and 21B, a portion of the etching hard mask layer 122 and the etching mask layer 123 is scraped off by using a milling method to make the mask layers 122, 123 having a predetermined shape, that is, nearly the same shape as the photoresist 124. Thereafter, the unwanted photoresist 124 is removed by a liftoff process.

Figure 22A:
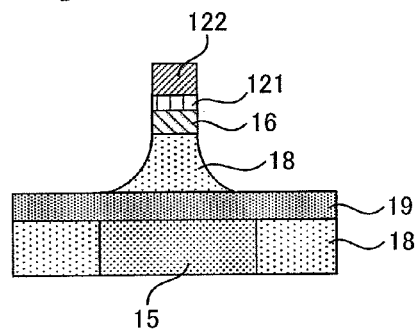
Figure 22B:
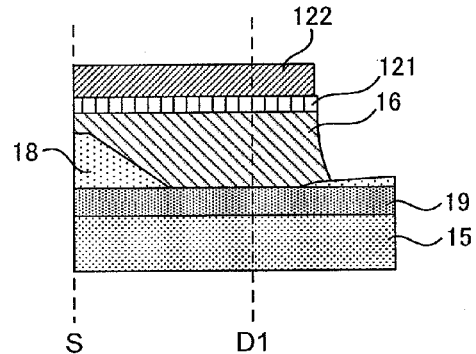

Next, as illustrated in FIGS. 22A and 22B, a portion f the metal layer 16, that is, a portion that is not covered by the mask layers 122, 123, is removed by, for example, reactive ion etching. As a result, the metal layer 16 is formed into a predetermined shape. Specifically, as illustrated in FIG. 22A, the metal layer 16 has a substantially rectangular shape at the air bearing surface S. Further, in etching such as the reactive ion etching, usually, a lower part of a remaining portion adjacent to the removed portion is likely to have a flare shape. By adjusting an etching rate, the lower part can be formed into a predetermined flare shape.

Specifically, as illustrated in FIG. 22A, at the air bearing surface S, a lower part of the insulating layer 18 has a flare shape. Similarly, at a cross section that is parallel to the air bearing surface S and is at a position away from the air bearing surface S, that is, at a cross section along a D1 line in FIG. 22B, the lower part of the metal layer 16 has a substantially flare shape. As a result, the metal layer 16 configures a plasmon generator having a shape as illustrated in FIG. 4.

Figure 23A:
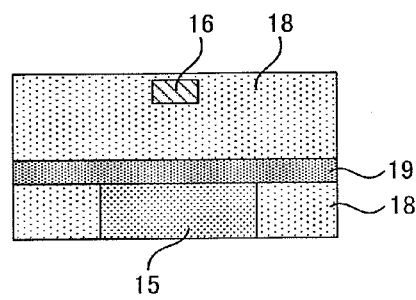
Figure 23B:
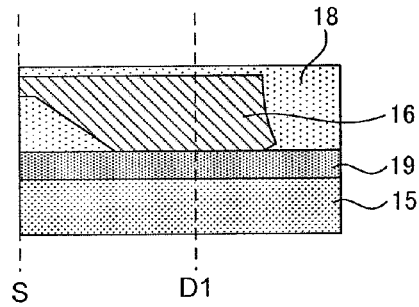

Thereafter, as illustrated in FIGS. 23A and 23B, the etching stopper layer 121 and the etching hard mask layer 122 are removed, and the insulating layer 18 of, for example, SiO2 and the like, is deposited. Alternatively, it is also possible to deposit the insulating layer 18 first, and, thereafter, remove a portion of the insulating layer by using CMP and remove the etching stopper layer 121 and the etching hard mask layer 122.

As described above, the plasmon generator 16 can be formed to have the predetermined shape. Here, as illustrated in FIG. 23A, the end surface of the plasmon generator 16 on the air bearing surface side is substantially rectangular. Further, at the cross section along the D1 line in FIG. 23B, the plasmon generator 16 has a shape as illustrated in FIG. 5.

Figure 24:
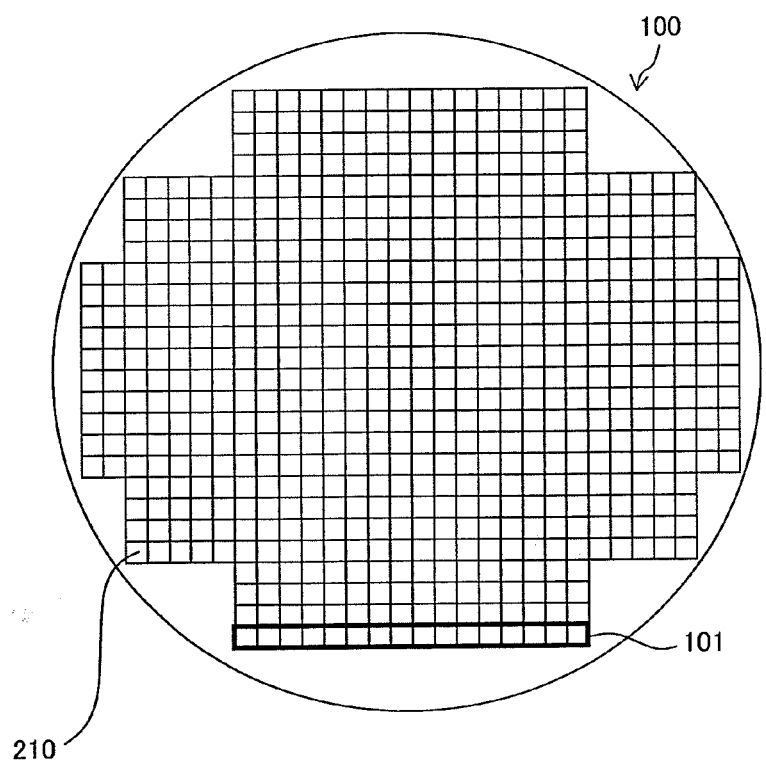
FIG. 24 is a plan view of a wafer for manufacturing a slider.

Next, a wafer used in manufacturing the above-described magnetic head 1 or slider 210 is explained. Referring to FIG. 24, at least the above-described slider 210 is film-formed in a wafer 100. The wafer 100 is divided into a plurality of bars 101, which are processing units when polish-processing the air bearing surface. The bar 101 is further cut after the polish-processing, and is separated into respective sliders 210. Margins for cutting (not illustrated) that are for cutting the wafer 100 into the bars 101 and the bars 101 into the sliders 210 are provided in the wafer 100. The laser diode unit 31 is attached to the slider 210. As a result, the above-described thermally-assisted magnetic recording head 1 is formed.

Figure 25:
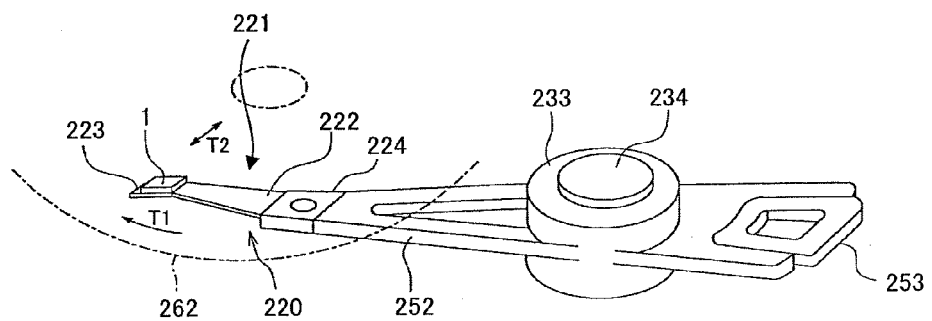
FIG. 25 is a perspective view of a head arm assembly containing a head gimbal assembly that incorporates a thermally-assisted magnetic recording head.

Referring to FIG. 25, a head gimbal assembly 220 is provided with the thermally-assisted magnetic recording head 1 and a suspension 221 elastically supporting the thermally-assisted magnetic recording head 1. The suspension 221 has a load beam 222, a flexure 223, and a base plate 224. The load beam 222 is formed from, for example, stainless steel and has a shape of a plate spring. The flexure 223 is provided on the load beam 222. The base plate 224 is provided on the other end of the load beam 222. The flexure 223 is joined to the thermally-assisted magnetic recording head 1 to provide an appropriate degree of freedom to the thermally-assisted magnetic recording head 1. A gimbal part for keeping a posture of the thermally-assisted magnetic recording head 1 constant is provided on a portion of the flexure 223 to which the thermally-assisted magnetic recording head 1 is attached.

The thermally-assisted magnetic recording head 1 opposes the hard disk 262 that is a recording medium of a discotic shape and is rotatably driven. When the hard disk 262 rotates in a T1 direction in FIG. 25, air flow passing between the hard disk 262 and the thermally-assisted magnetic recording head 1 generates a lifting force downward on the thermally-assisted magnetic recording head 1. The thermally-assisted magnetic recording head 1 flies from the surface of the hard disk 262 due to the lifting force.

An assembly in which the head gimbal assembly 220 is attached to an arm 252 is referred to as a head arm assembly. The arm 252 moves the thermally-assisted magnetic recording head 1 in a T2 direction (track width direction) of FIG. 25. This allows the thermally-assisted magnetic recording head 1 to move from a specified track of the hard disk 262 to another track.

One end of the arm 252 is attached to the base plate 224. On the other end part of the arm 252, a coil 253 that forms a part of a voice coil motor is attached. A bearing part 233 is provided in a middle portion of the arm 252. The arm 252 is rotatably supported by a shaft 234 that is provided on the bearing part 233. The voice coil motor, which drives the arm 252, and the arm 252 configure an actuator.

Figure 26:
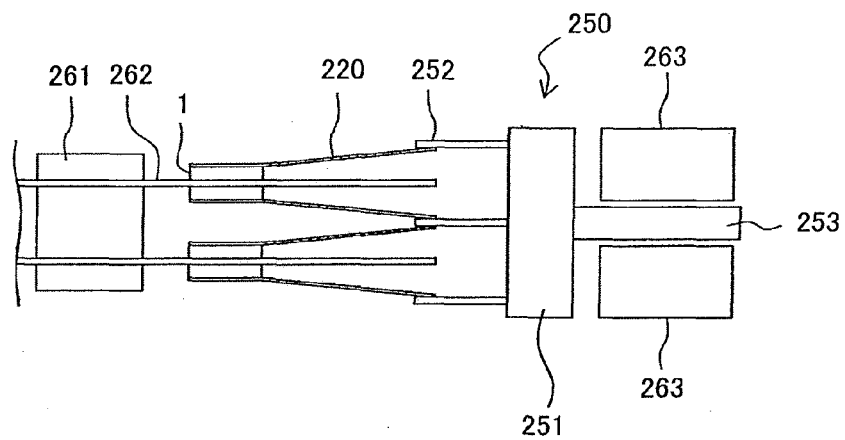
FIG. 26 is a lateral view of a head stack assembly that incorporates a thermally-assisted magnetic recording head.
Figure 27:
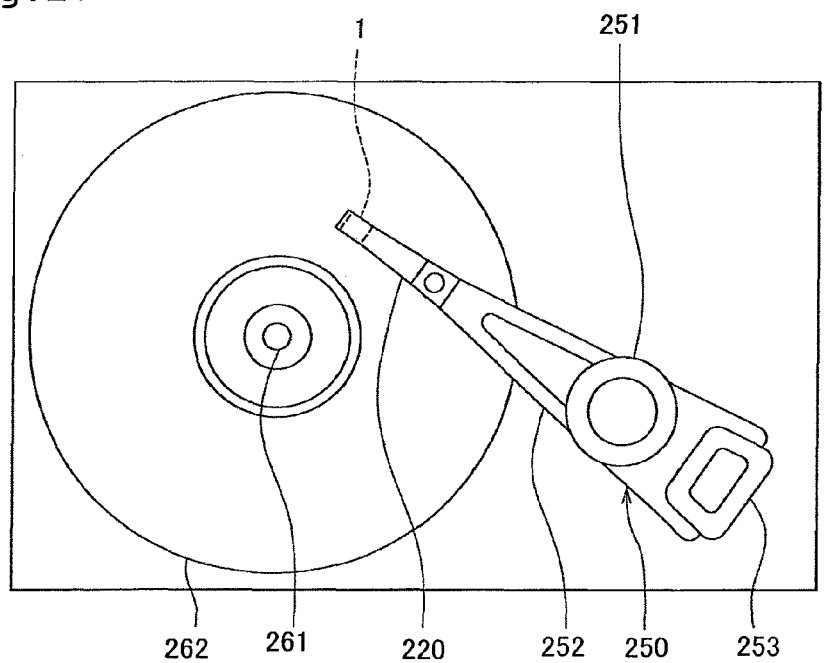
FIG. 27 is a plane view of a hard disk drive apparatus that incorporates a thermally-assisted magnetic recording head.

Next, referring to FIGS. 26 and 27, a head stack assembly, in which the above-described thermally-assisted magnetic recording head 1 is incorporated, and a hard disk apparatus are explained. The head stack assembly is an assembly in which the head gimbal assembly 220 is attached to each arm 252 of a carriage 251 that has a plurality of arms 252. FIG. 26 is a side view of the head stack assembly.

The head stack assembly as a positioning device 250 has the carriage 251 that has the plurality of the arms 252. The head gimbal assemblies 220 are attached to the arms 230 in a manner to align themselves in the perpendicular direction at intervals from each other. On an opposite side of the arm 252 of the carriage 251, the coil 231 that forms a part of the voice coil motor is attached. The voice coil motor has permanent magnets 263 that oppose each other across the coil 251.

Referring to FIG. 27, the head stack assembly 250 is incorporated into the hard disk apparatus. The hard disk apparatus has a plurality of the hard disks 262 attached to a spindle motor 261. On each hard disk 262, two thermally-assisted magnetic recording heads 1 are arranged in a manner opposing each other across the hard disk 262. The head stack assembly 250, excluding the thermally-assisted magnetic recording head 1, and the above-described actuator correspond to the positioning device, support the thermally-assisted magnetic recording head 1 and position the thermally-assisted magnetic recording head 1 with respect to the hard disk 262. The thermally-assisted magnetic recording head 1 is moved by the actuator in the track width direction of the hard disk 262 and is positioned with respect to the hard disk 262. The thermally-assisted magnetic recording head 1 uses the recording head part to record information to the hard disk 262 and uses the reading head part to reproduce the information recorded in the hard disk 262.

A preferred embodiment of the present invention is presented and explained in detail. However, it is to be understood that, without departing from the spirit or scope of the appended claims, various changes and modifications are possible.

What is claimed is:

1. A plasmon generator, in which a surface plasmon is excited by application of light, extending along one direction, and comprising:
   a first end surface that is positioned on one end in the one direction and at which near-field light is generated along with the excitation of the plasmon; and
   a second cross section that is substantially parallel to the first end surface and is away from the first end surface,
   the first end surface having a polygonal shape that does not have a substantially acute inner angle,
   the second cross section having an upper part that has a shape substantially the same as or similar to that of the first end surface, and a flare shaped lower part that is connected to the upper part and has a width that increases as it is far from the upper part in said second cross section.

2. The plasmon generator according to claim 1, wherein the first end surface and the upper part at the second cross section are substantially rectangular or square.

3. The plasmon generator according to claim 1, further comprising:

an inclined surface for reducing a thickness of the lower part toward the first end surface.

4. The plasmon generator according to claim 1, wherein the width of the lower part increases with distance from the first end surface.

5. The plasmon generator according to claim 1, wherein the plasmon generator is formed from substantially gold.

6. The plasmon generator according to claim 2, wherein a contour of the upper part at the second cross section includes a linear top side and a pair of first lateral sides that are connected to end points of the top side and are substantially orthogonal to the top side, a contour of the lower part at the second cross section includes a bottom side that is substantially parallel to the linear top side and a pair of second lateral sides that are inclined at acute angles with respect to the bottom side and are connected to end points of the bottom side, the pair of the first lateral sides are respectively connected to the pair of the second lateral sides.

7. The plasmon generator according to claim 6, wherein angles between the bottom side and the second lateral sides are within a range of 10 to 90 degrees.

8. The plasmon generator according to claim 6, wherein angles between the bottom side and the second lateral sides are approximately 70 degrees.

9. The plasmon generator according to claim 1, wherein the flare shaped lower part is a portion to which light for exciting the surface plasmon is applied.

10. A thermally-assisted magnetic recording head, comprising:

the plasmon generator according to claim 1, wherein the first end surface of the plasmon generator is configured to oppose a magnetic recording medium.

11. The thermally-assisted magnetic recording head according to claim 10, further comprising:

a waveguide that guides light coupling with the plasmon generator in a surface plasmon mode, wherein the lower part of the plasmon generator faces the waveguide.

12. The thermally-assisted magnetic recording head according to claim 11, wherein the plasmon generator couples with evanescent light that penetrates from the waveguide in the surface plasmon mode.

13. The thermally-assisted magnetic recording head according to claim 10, further comprising:

a magnetic pole that generates a magnetic field for writing magnetic information to a magnetic recording medium; wherein the magnetic pole faces the upper part of the plasmon generator.

14. The thermally-assisted magnetic recording head according to claim 11, further comprising:

a light source unit generating light incident to the waveguide.

15. A slider, comprising:

the plasmon generator according to claim 1.

16. A wafer in which the slider according to claim 15 is formed.

17. A head gimbal assembly, comprising:

the thermally-assisted magnetic recording head according to claim 10; and a suspension that elastically supports the thermally-assisted magnetic recording head.

18. A hard disk drive apparatus, comprising:

the thermally-assisted magnetic recording head according to claim 10; and a device that supports the thermally-assisted magnetic recording head and position the thermally-assisted magnetic recording head with respect to the magnetic recording medium.

19. The plasmon generator according to claim 1, wherein a contour of the lower part at the second cross section includes a bottom side opposite to the upper part and a pair of second lateral sides that are inclined at acute angles with respect to the bottom side.

* * * * *